(12) United States Patent
Rathay et al.

(10) Patent No.: US 11,745,859 B2
(45) Date of Patent: Sep. 5, 2023

(54) COMBUSTION-POWERED FLOW CONTROL ACTUATOR WITH HEATED WALLS

(71) Applicant: General Electric Company, Schenectady, NY (US)

(72) Inventors: Nicholas William Rathay, Rock City Falls, NY (US); Narendra Digamber Joshi, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/118,878

(22) Filed: Aug. 31, 2018

(65) Prior Publication Data
US 2020/0070961 A1  Mar. 5, 2020

(51) Int. Cl.
*B64C 21/04* (2023.01)
*F23R 3/00* (2006.01)
*F02K 1/28* (2006.01)
*F23R 3/28* (2006.01)

(52) U.S. Cl.
CPC ............... *B64C 21/04* (2013.01); *F02K 1/28* (2013.01); *F23R 3/002* (2013.01); *F23R 3/28* (2013.01); *F05D 2220/323* (2013.01)

(58) Field of Classification Search
CPC .......... F23C 99/001; F23C 2900/99005; F23C 15/00; F23R 2900/00008; F23R 2900/00009; F02K 1/28; F02K 7/02; F02K 9/80; F02K 9/82
See application file for complete search history.

(56) References Cited

U.S. PATENT DOCUMENTS

| | | | |
|---|---|---|---|
| 3,556,443 A | | 1/1971 | Kidwell |
| 5,257,500 A | * | 11/1993 | Venkataramani ....... F02C 7/264 |
| | | | 219/121.5 |
| 5,513,489 A | * | 5/1996 | Bussing ................ B05B 7/0006 |
| | | | 60/39.38 |

(Continued)

OTHER PUBLICATIONS

Wang Lin, Luo ZhenBing*, Xia ZhiXun, Liu Bing & Deng Xiong, "Review of actuators for high speed active flow control," Sci China Tech Sci, 2012, 55: 2225-2240, May 2012. (Year: 2012).*

(Continued)

*Primary Examiner* — Todd E Manahan
*Assistant Examiner* — David P. Olynick
(74) *Attorney, Agent, or Firm* — Dority & Manning, P.A.

(57) ABSTRACT

A flow control actuator includes a first side wall, a second side wall opposite and substantially parallel to the first side wall, an upstream wall mechanically coupled to upstream ends of the first and second side walls, and a downstream cap mechanically coupled to downstream ends of the first and second side walls. The first side wall, the second side wall, the upstream wall and the downstream cap collectively define an interior of the flow control actuator. An energy source is disposed in at least one of the first sidewall and the second sidewall. At least one fuel injector is disposed in the upstream wall, the first sidewall and/or the second sidewall for dispersing fuel into the flow control actuator. At least one air inlet is disposed in the upstream wall, the first sidewall and/or the second sidewall for introducing air into the flow control actuator. Fuel from fuel injector and air from the air inlet are ignited in the flow control actuator.

10 Claims, 12 Drawing Sheets

(56) References Cited

U.S. PATENT DOCUMENTS

| | | | |
|---|---|---|---|
| 6,293,275 B1* | 9/2001 | Wunning | F02G 1/043 |
| | | | 126/101 |
| 6,484,492 B2 | 11/2002 | Meholic et al. | |
| 6,554,607 B1* | 4/2003 | Glezer | F23C 15/00 |
| | | | 122/24 |
| 6,796,532 B2 | 9/2004 | Malmuth et al. | |
| 7,183,515 B2 | 2/2007 | Miller et al. | |
| 7,870,820 B2 | 1/2011 | Pivik | |
| 8,205,433 B2 | 6/2012 | Boespflug et al. | |
| 8,242,404 B2 | 8/2012 | Miller et al. | |
| 8,453,457 B2 | 6/2013 | Ginn et al. | |
| 8,887,482 B1 | 11/2014 | Ruggeri et al. | |
| 9,361,876 B2 | 6/2016 | Vuillemin | |
| 9,656,740 B2 | 5/2017 | Goelling | |
| 2002/0088219 A1* | 7/2002 | Meholic | F02K 7/02 |
| | | | 60/204 |
| 2004/0031257 A1* | 2/2004 | Schmotolocha | F23Q 13/00 |
| | | | 60/39.826 |
| 2006/0175306 A1* | 8/2006 | Prociw | F02C 7/264 |
| | | | 219/121.57 |
| 2007/0180810 A1* | 8/2007 | Chapin | F01D 25/12 |
| | | | 60/776 |
| 2010/0226842 A1* | 9/2010 | Sobolevskiy | B01J 23/63 |
| | | | 423/247 |
| 2013/0139487 A1* | 6/2013 | Kenyon | F02C 5/00 |
| | | | 60/39.76 |
| 2015/0239552 A1 | 8/2015 | Nikic | |
| 2016/0123577 A1* | 5/2016 | Dumas | F23C 99/001 |
| | | | 431/8 |

OTHER PUBLICATIONS

Jichul Shin, Venkat Narayanaswamy, Laxminarayan L. Raja, and Noel T. Clemens, "Characteristics of a plasma actuator in Mach 3 flow," AIAA 2007-788, Jan. 2007. (Year: 2007).*

E Menier, L Leger, E Depussay, V Lago and G Artana, "Effect of a dc discharge on the supersonic rarefied air flow over a flat plate," J. Phys. D: Appl. Phys. 40 (2007) 695-701, Jan. 2007. (Year: 2007).*

Andrew D. Cutler, "High-Frequency Pulsed Combustion Actuator Experiments," AIAA Journal, vol. 49, No. 9, Sep. 2011. (Year: 2011).*

H. Quintens, C. Strozzi, R. Zitoun, M. Bellenoue, "Deflagration/Autoignition/Detonation Transition Induced by Flame Propagation in an N-Decane/O2 /Ar Mixture," Flow, Turbulence and Combustion (2019) 102: 735-755 (Year: 2018).*

J. Chao, T. Otsuka, J.H.S. Lee "An experimental investigation of the onset of detonation," Proceedings of the Combustion Institute 30 (2005) 1889-1897. (Year: 2005).*

* cited by examiner

COMBUSTION-POWERED FLOW CONTROL ACTUATOR WITH HEATED WALLS

BACKGROUND

The subject matter disclosed herein relates to flow control actuators and more specifically to combustion-powered flow control actuators with heated walls.

Aerodynamic flow control can be broadly defined as the manipulation of a fluid to achieve a desired outcome. Applications can include boundary layer separation control, transition control, shock wave/boundary layer interaction, and thrust vectoring, all of which can have advantages in numerous practical applications. Furthermore, there are a variety of flow control actuators that can be used to achieve these outcomes. Actuator strength (sometimes quantified as momentum addition into the flow) and frequency are both regarded as important parameters that are typically maximized to obtain the greatest flow control authority. However, many of today's flow control actuators are typically good in one regard, but not the other. For example, plasma actuators operate at a very high frequency (10 kHz), but have little control authority. Pulse detonation actuators (PDA), which are a combustion-based actuator, are very strong, but operate at low frequencies (10 Hz). Fluidic oscillators require a considerable amount of air flow from an external source, which represents a large efficiency penalty. In addition, other flow control actuators (e.g., synthetic jets), have durability problems and are not robust enough for most engineering applications, particularly in harsh environments.

The pulse detonation actuation (PDA) combustion process is typically initiated by a spark or plasma at one end of the flow control actuator, which results in a deflagration flame. Given a long enough time and a large enough tube, the deflagration flame transitions to a detonation wave. Detonation provides a benefit over deflagration from a flow efficiency and/or combustion efficiency perspective. However, PDA tubes are quite long (and heavy) and the process is relatively slow, which limits the actuator frequency.

BRIEF DESCRIPTION OF THE EMBODIMENTS

Aspects of the present embodiments are summarized below. These embodiments are not intended to limit the scope of the present claimed embodiments, but rather, these embodiments are intended only to provide a brief summary of possible forms of the embodiments. Furthermore, the embodiments may encompass a variety of forms that may be similar to or different from the embodiments set forth below, commensurate with the scope of the claims.

In one aspect, a flow control actuator includes a first side wall, a second side wall opposite and substantially parallel to the first side wall, an upstream wall mechanically coupled to upstream ends of the first and second side walls, and a downstream cap mechanically coupled to downstream ends of the first and second side walls. The first side wall, the second side wall, the upstream wall and the downstream cap collectively define an interior of the flow control actuator. An energy source is disposed in at least one of the first sidewall and the second sidewall. At least one fuel injector is disposed in the upstream wall, the first sidewall and/or the second sidewall for dispersing fuel into the flow control actuator. At least one air inlet is disposed in the upstream wall, the first sidewall and/or the second sidewall for introducing air into the flow control actuator. Fuel from fuel injector and air from the air inlet are ignited in the flow control actuator.

In another aspect, a flow control system includes a flow control actuator including a first side wall, a second side wall opposite the first side wall, the second side wall substantially parallel to the first side wall, an upstream wall mechanically coupled to upstream ends of each of the first and second side walls, a downstream cap mechanically coupled to downstream ends of each of the first and second side walls, the downstream cap including at least one orifice, at least one energy source disposed in at least one of the first sidewall and the second sidewall, at least one fuel injector disposed in the upstream wall, and at least one air inlet disposed in the upstream wall. The flow control system further includes a target surface. Fuel from the at least one fuel injector and air from the at least one air inlet are ignited in the interior of the flow control actuator and dispersed at the target surface.

In another aspect, a flow control actuator includes a first side wall, a second side wall opposite the first side wall, an upstream wall mechanically coupled to upstream ends of each of the first and second side walls, a downstream cap mechanically coupled to downstream ends of each of the first and second side walls, the downstream cap comprising at least one orifice, at least one energy source disposed in at least one of the first sidewall and the second sidewall, at least one fuel injector disposed in the upstream wall, at least one air inlet disposed in the upstream wall, and at least one igniter disposed in at least one of the first side wall and the second side wall. The at least one igniter is disposed between about 5% and about 40% of the distance from the upstream wall to the downstream cap.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "axial" refers to a direction aligned with a central axis or shaft of the gas turbine engine or alternatively the central axis of a propulsion engine and/or internal combustion engine. An axially forward end of the gas turbine engine is the end proximate the fan and/or compressor inlet where air enters the gas turbine engine. An axially aft end of the gas turbine engine is the end of the gas turbine proximate the engine exhaust where low pressure combustion gases exit the engine via the low pressure (LP) turbine. In non-turbine engines, axially aft is toward the exhaust and axially forward is toward the inlet.

As used herein, the term "circumferential" refers to a direction or directions around (and tangential to) the circumference of an annulus of a combustor, or for example the circle defined by the swept area of the turbine blades. As used herein, the terms "circumferential" and "tangential" are synonymous.

As used herein, the term "radial" refers to a direction moving outwardly away from the central axis of the gas turbine, or alternatively the central axis of a propulsion engine. A "radially inward" direction is aligned toward the central axis moving toward decreasing radii. A "radially outward" direction is aligned away from the central axis moving toward increasing radii.

Figure 1:
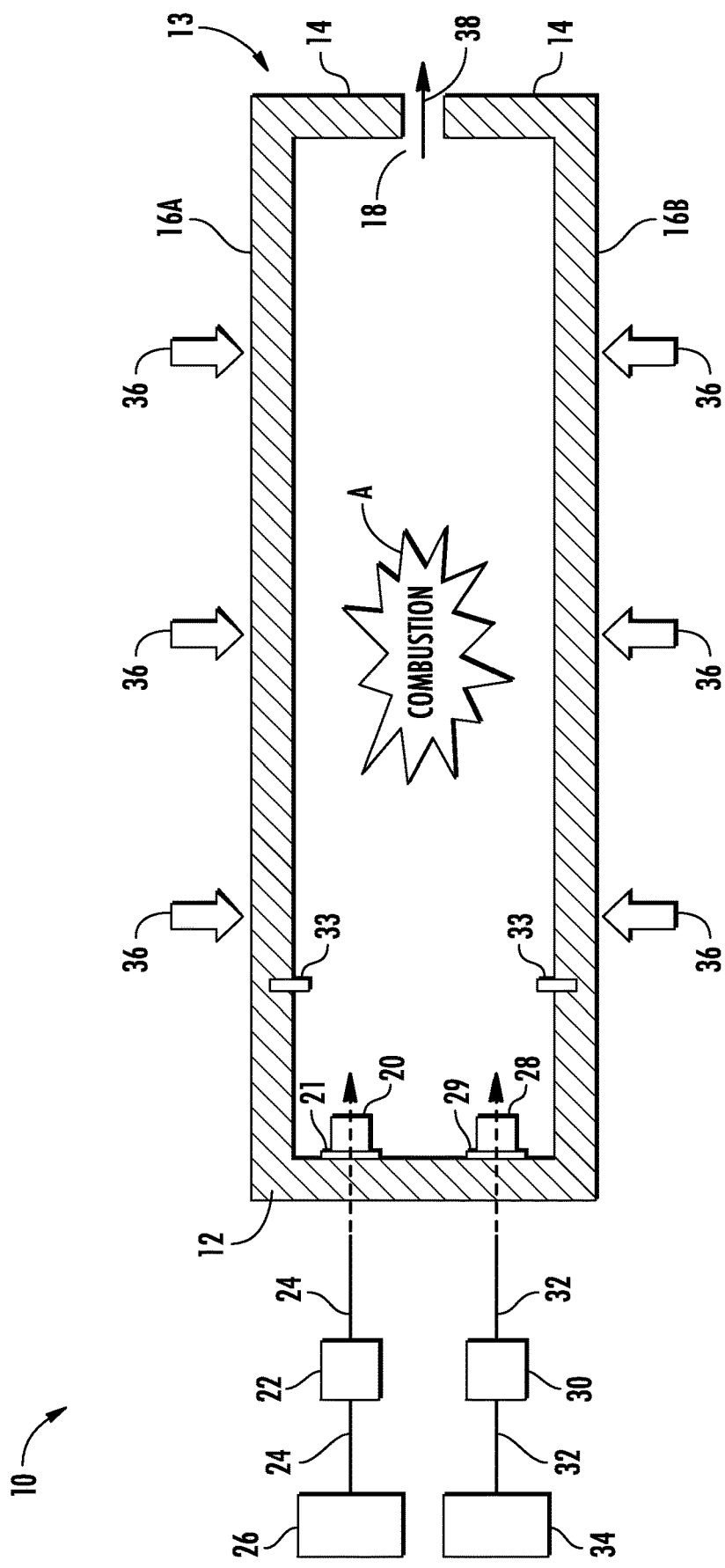
FIG. 1 is a side schematic representation of a flow control actuator.

FIG. 1 illustrates a flow control actuator 10 with a cap 14 disposed at a downstream end 13 of the flow control actuator 10. The flow control actuator extends from an upstream wall 12 to the downstream end 13, and from a first sidewall 16A to a second sidewall 16B. The upstream wall 12, the downstream cap 14, the first side wall 16A and the second sidewall 16B collectively define a cavity that forms the interior of the flow control actuator 10. In the interior of the flow control actuator 10 is a region A in which combustion may occur. In some embodiments, the first and second sidewalls 16A, 16B may form an integral, continuous, cylindrical side wall. Similarly, the first side wall 16A and the second side wall 16B may form an integral, continuous, cylindrical tube. In other embodiments, each of the first and second sidewalls 16A, 16B are discrete planar walls. In this embodiment with the first and second sidewalls 16A, 16B forming discrete planar walls, the flow control actuator 10 may also include circumferential planar walls (not shown), the circumferential planar walls also acting to define the interior of the flow control actuator 10. For example, the circumferential planar walls may be parallel or substantially parallel to the plane defined by the paper on which FIG. 1 may be printed. In other embodiments, the first and second sidewalls 16A, 16B form the radially outer and radially inner walls respectively, of an annular combustor.

Disposed in the upstream wall 12 is a fuel injector 20 and an air inlet 28. The fuel injector 20 introduces fuel into the interior of the flow control actuator 10 while the air inlet 28 introduces air into the interior of the flow control actuator 10. The fuel injector 20 is fluidly coupled to a fuel control valve 22 via a fuel supply line 24. A fuel supply 26 is fluidly coupled to and upstream of the fuel control valve 22, again via the fuel supply line 24.

The air inlet is fluidly coupled to an airflow control mechanism 30 via an air supply line 32. An air supply 34 is fluidly coupled to and upstream of the airflow control mechanism 30, again via the air supply line 32. The airflow control mechanism 30 may include any of an airflow control valve, at least one inlet guide vane capable of changing pitch, a rotary compressor capable of spooling up or down in speed as needed to adjust the airflow, a reciprocating compressor capable of changing speed as needed to adjust the airflow, as well as other airflow control mechanisms. A fuel injector articulator 21 may be mechanically coupled to the fuel injector 20 for adjusting an angle at which fuel is dispersed into the interior of the flow control actuator 10. An airflow modulator 29 may be mechanically coupled to the air inlet 28 for adjusting an angle at which air is dispersed into the interior of the flow control actuator 10. Both the angles at which fuel and air are dispersed into the interior of the flow control actuator 10, as well as the respective fuel and air mass flowrates may be controlled in concert with each other in order to achieve the desired combustion, thermal, and/or aerodynamic conditions within the flow control actuator 10.

The cap 14 acts as a nozzle to both control the flow of combustion gas out of the flow control actuator 10, but also to accelerate the combustion gas, thereby forming at least one high-speed jet 38 of combustion gas exiting the flow control actuator through at least one orifice 18, disposed in the cap 14 at the downstream end 13 of the flow control actuator 10. In other embodiments, a tube (not shown) may be disposed in the cap 14, the tube extending in a downstream direction aft of the downstream end 13 for carrying combustion gases downstream. In still other configurations of the present embodiments, the flow control actuator 10 may include a conical exhaust tube (not shown) disposed at the aft end of the orifice 18, and/or an articulating exhaust tube (not shown) for adjusting the angle at which the high-speed jet exits 38 the flow control actuator 10. In addition, the flow control actuator 10 may include multiple orifices 18 each dispersing a high-speed jet 38. The cap 14 provides flow control by restricting the flow area via the orifice 18.

The flow control actuator 10 of the present embodiments may include other configurations with respect to the air inlet 28 and the fuel injector 20. For example, the flow control actuator 10 may include multiple air inlets 28 and/or multiple fuel injectors 20 arranged in various configurations disposed within the upstream wall 12. In addition, the flow control actuator 10 may include one or more fuel injectors 20 and/or air inlets 28 disposed in the first and/or the second sidewall 16A, 16B. In addition, the airflow inlet 28 and fuel injector 20 may be integrated into a single swirler-mixer (not shown) that introduces both air and fuel into the interior of the flow control actuator 10 simultaneously, while also circumferentially mixing the fuel and air to encourage atomization of the fuel within the air. The fuel may include liquid fuels such as kerosene, jet fuel, JP-8, JP-4, JP-5, gasoline, Jet A as well as other fuels.

Still referring to FIG. 1, the flows of air and fuel into the interior of the flow control actuator 10 mix and combust in the combustion zone A. The combustion is aided by energy 36 from the first and second side walls 16A, 16B. The energy 36 may be in the form of thermal energy via an external heat source (not shown) that heats up the first and second side walls 16A, 16B. The energy 36 may also be in the form of electrical energy which flows into or through the first and second side walls 16A, 16B, thereby increasing the temperature of the first and second side walls 16A, 16B, and in turn, increasing the temperature of the interior of the flow control actuator 10.

Referring still to FIG. 1, at least one igniter 33 may be disposed in the first and/or second side walls 16A, 16B for igniting the fuel and air mixture in the interior of the flow control actuator 10. The one or more igniters 33 may be disposed in the vicinity of the upstream wall 12. For example, the one or more igniters 33 may be disposed in the first and/or second side walls 16A, 16B closer to the upstream wall 12 than to the downstream end 13 of the flow control actuator 10. In some embodiments, the one or more igniters 33 may be disposed in the first and/or second side walls 16A, 16B from about 0% to about 50% of the distance from the upstream wall 12 to the downstream end 13 of the flow control actuator 10. In other embodiments, the one or more igniters 33 may be disposed in the first and/or second side walls 16A, 16B from about 5% to about 40% of the distance from the upstream wall 12 to the downstream end 13 of the flow control actuator 10. In other embodiments, the one or more igniters 33 may be disposed in the first and/or second side walls 16A, 16B from about 10% to about 35% of the distance from the upstream wall 12 to the downstream end 13 of the flow control actuator 10. In other embodiments, the one or more igniters 33 may be disposed in the first and/or second side walls 16A, 16B from about 15% to about 30% of the distance from the upstream wall 12 to the downstream end 13 of the flow control actuator 10. In other embodiments, the one or more igniters 33 may be disposed in the first and/or second side walls 16A, 16B from about 20% to about 25% of the distance from the upstream wall 12 to the downstream end 13 of the flow control actuator 10.

In operation, the fuel and air mix and ignite in the upstream portion of the flow control actuator 12 in the vicinity of the upstream wall 12, or for example from about 0% to about 50% of the distance from the upstream wall 12 to the downstream end 13 of the flow control actuator 12. Deflagration occurs in the upstream portion of the flow control actuator 12. During deflagration, a flame front travels sub-sonically downstream toward the downstream end 13. As the subsonic flame front, together with unignited fuel and air, travel downstream toward the downstream end 13, they absorb heat from the first and second sidewall 16A, 16B. As the flame front and any unignited fuel and air absorb heat from the first and second sidewall 16A, 16B, deflagration transitions to detonation. During detonation, any as-yet unignited fuel and air is ignited and the flame front and combustion gases are accelerated to supersonic speeds, prior to exiting the flow control actuator 12 through orifice 18 in a high-speed jet 38. In some embodiments, individual igniters 33 may not be needed as thermal energy from the first and second sidewalls 16A, 16B may be sufficient to ignite the fuel and air mixture in the upstream portion of the flow control actuator 10 where deflagration occurs; thermal energy from the first and second sidewalls 16A, 16B may also be sufficient to transition the deflagration in the upstream portion of the flow control actuator 10 to detonation in the downstream portion of the flow control actuator 10 without the need for individual igniters 33. In some embodiments and/or under some operating conditions, deflagration may occur supersonically while detonation may occur hypersonically (for example at about Mach 5 or faster). In some other embodiments and/or under some other operating conditions, detonation flame fronts and/or pressure waves may propagate at speed several times faster than those of deflagration.

Still referring to FIG. 1, In some embodiments, one or more igniters 33 may be disposed in the first and/or the second side walls 16A, 16B without being used in certain operating conditions in which the fuel, air and/or partially ignited mixture is absorbing sufficient thermal energy from the side walls. The transition from deflagration to detonation may occur from about 20% to about 80% of the distance from the upstream wall 12 to the downstream end 13. In other embodiments, the transition from deflagration to detonation may occur from about 30% to about 70% of the distance from the upstream wall 12 to the downstream end 13. In other embodiments, the transition from deflagration to detonation may occur from about 40% to about 60% of the distance from the upstream wall 12 to the downstream end 13. In other embodiments, the transition from deflagration to detonation may occur from about 45% to about 55% of the distance from the upstream wall 12 to the downstream end 13.

Figure 2:
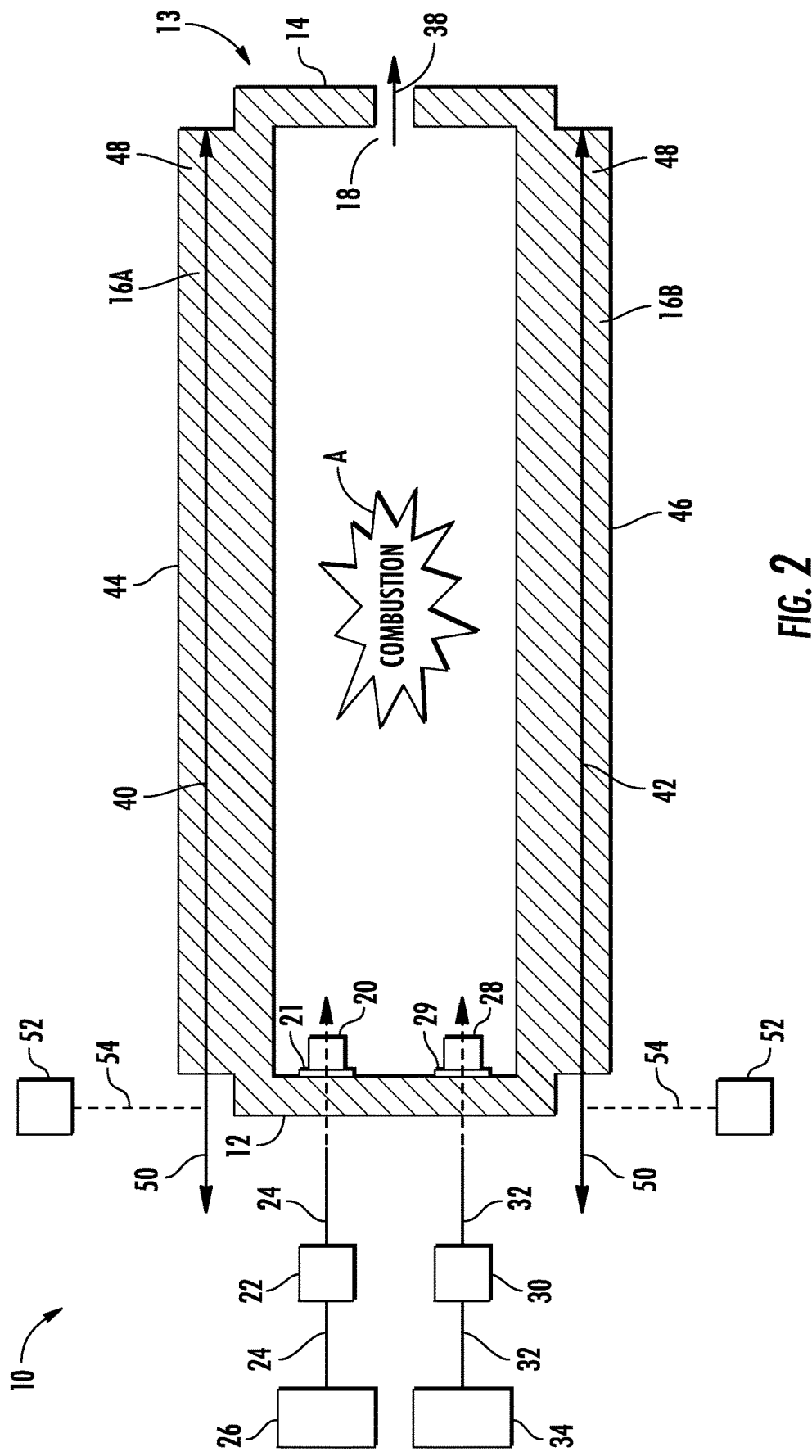
FIG. 2 is a side schematic representation of a flow control actuator.

FIG. 2 illustrates a flow control actuator 10 with a cap 14 disposed at a downstream end 13 of the flow control actuator 10. The flow control actuator extends from an upstream wall 12 to the downstream end 13, and from a first sidewall 16A to a second sidewall 16B. In the interior of the flow control actuator 10 is a region A in which combustion may occur. In some embodiments, the first and second sidewalls 16A, 16B may form an integral, continuous, cylindrical side wall. In other embodiments, each of the first and second sidewalls 16A, 16B are discrete planar walls. In other embodiments, the first and second sidewalls 16A, 16B form the radially outer and radially inner walls respectively, of an annular combustor. Disposed in the upstream wall 12 is a fuel injector 20 and an air inlet 28. The fuel injector 20 introduces fuel into the interior of the flow control actuator 10 while the air inlet 28 introduces air into the interior of the flow control actuator 10. The fuel injector 20 is fluidly coupled to a fuel control valve 22 via a fuel supply line 24. A fuel supply 26 is fluidly coupled to and upstream of the fuel control valve 22, again via the fuel supply line 24.

In the embodiment of FIG. 2, external energy (not associated with the combustion) in the form of heat is transferred to the first and second side walls 16A, 16B via first and second fluid conduits 40, 42. Fluid flows through the first and second fluid conduits 40, 42 thereby transferring heat into the first and second side walls 16A, 16B which are composed at least partially of at least one of a first thermally conductive material 44 and a second thermally conductive material 46. The first and/or second conductive materials 44, 46 of the first and second side walls 16A, 16B allow thermal energy to transfer from the first and second fluid conduits 40, 42 into the interior of the flow control actuator 10. The first and second fluid conduits 40, 42 are fluidly coupled via coupling 54 to at least one heat source 52. The fluid in the first and second fluid conduits 40, 42 may be fuel which may be used to cool some other component such as electronics for an aircraft. The fluid picks up heat from the electronics thereby cooling the electronics and then transfers the heat to the conductive materials 44, 46 of the first and second side walls 16A, 16B and eventually into the interior of the flow control actuator 10. The fluid in the first and second fluid conduits 40, 42 may also be fuel which may be used to cool some other component such as an aircraft outer surface in a supersonic and/or hypersonic application. In other embodiments, the first and second fluid conduits 40, 42 may act as heat pipes by containing one or more fluids that evaporate at a heat source temperature and condense at a heat sink temperature. For example, the first and second fluid conduits 40, 42 may contain one or more fluids that evaporate at the temperature of the heat source 52 and that condense at the temperature of the interior of the flow control actuator 10. For example, the first and second fluid conduits 40, 42 may contain one or more liquid metals and/or vapor metals (i.e., metallic material that is in a liquid and/or vapor phase at the operating conditions of the flow control actuator 10).

Still referring to FIG. 2, the fluid(s) in the first and second fluid conduits 40, 42 may flow from the upstream wall 12 toward the downstream end 13 in a downstream direction 48. Similarly, in conditions where it is desirable to have the highest temperature fluid introduced in the downstream portion of the flow control actuator 12, the fluid(s) in the first and second fluid conduits 40, 42 may flow from the downstream end 13 toward the upstream wall 12, in an upstream direction 50. In some embodiments, the first and second fluid conduits 40, 42 may allow fluid(s) to flow in either the upstream direction 50 or the downstream direction 48, as needed, to accommodate varying flow, aerodynamic, combustion, and/or thermal conditions within the flow control actuator.

Figure 3:
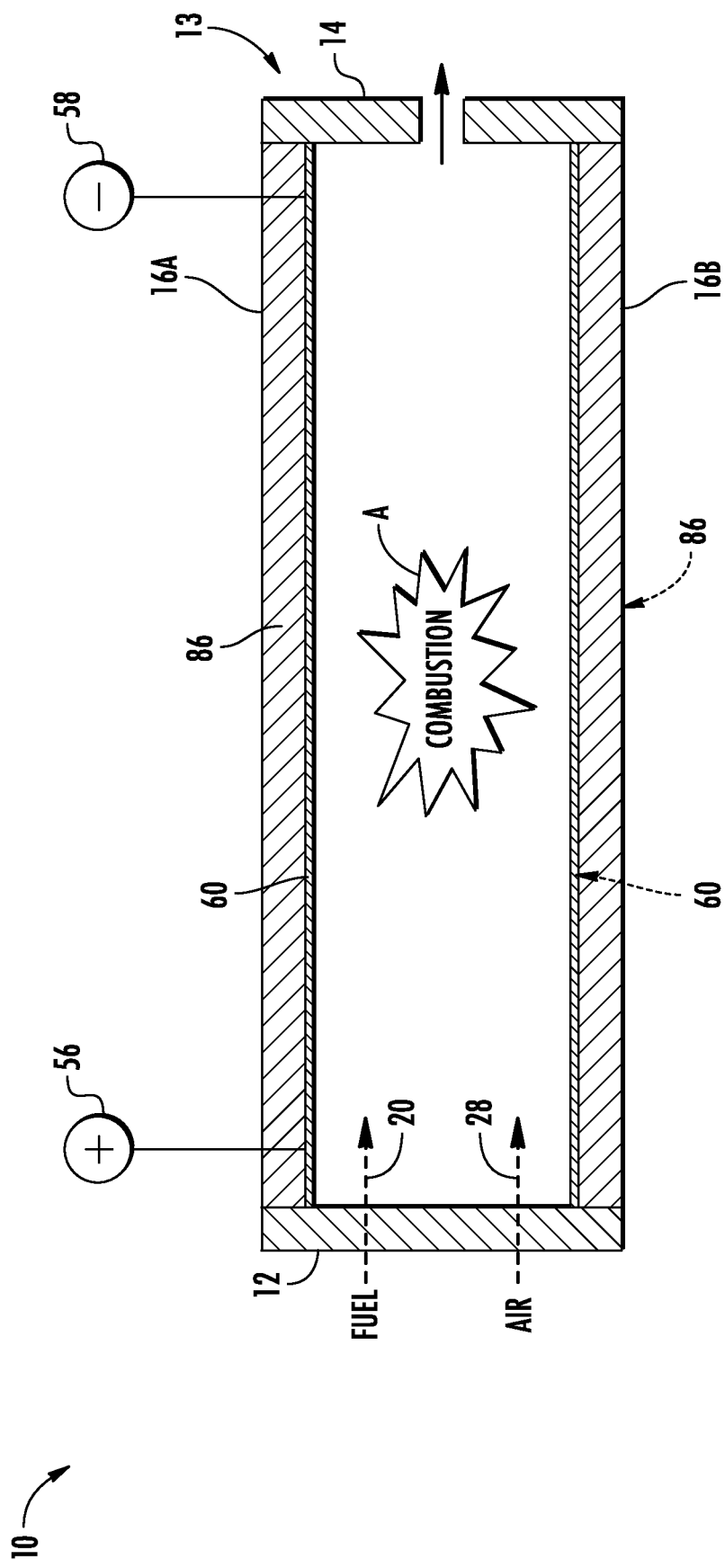
FIG. 3 is a side schematic representation of a flow control actuator.

FIG. 3 illustrates a flow control actuator 10 with a cap 14 disposed at a downstream end 13 of the flow control actuator 10. The flow control actuator extends from an upstream wall 12 to the downstream end 13, and from a first sidewall 16A to a second sidewall 16B. In the interior of the flow control actuator 10 is a region A in which combustion may occur. In some embodiments, the first and second sidewalls 16A, 16B may form an integral, continuous, cylindrical side wall. In other embodiments, each of the first and second sidewalls 16A, 16B are discrete planar walls. In other embodiments, the first and second sidewalls 16A, 16B form the radially outer and radially inner walls respectively, of an annular combustor. Disposed in the upstream wall 12 is a fuel injector 20 and an air inlet 28.

In the embodiment of FIG. 3, a positively charged electrode and/or electrical conductor 56 may be disposed in at least one of the first and second sidewalls 16A, 16B in an upstream portion proximate the upstream wall 12. The flow control actuator 10 may also include a negatively charged and/or electrical conductor 58 disposed in at least one of the first and second sidewalls 16A, 16B in a downstream portion proximate the downstream end 13. At least one heater 60 (such as a joule heater) may extend between the positively and negatively charged electrodes 56, 58 at the boundary between each of the first and second side walls 16A, 16B, and the interior of the flow control actuator 10. An electrically insulating material 86 may surround the at least one heater 60. In operation, the heater 60 may carry electrical charges from the positively charged electrode 56 to the negatively charged electrode 58 creating thermal energy which is then transferred in the form of heat to the interior of the flow control actuator 10.

Figure 4:
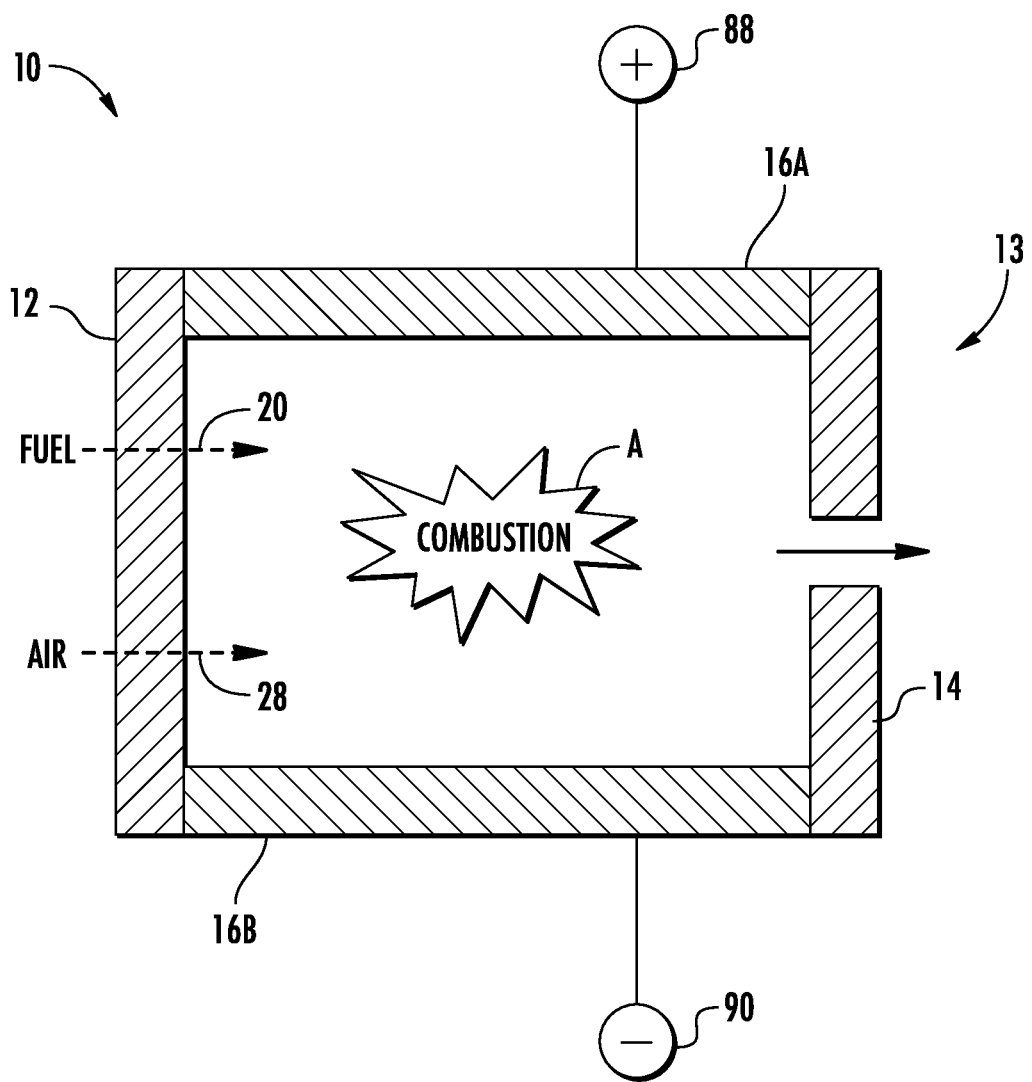
FIG. 4 a side schematic representation of a flow control actuator.

FIG. 4 illustrates a flow control actuator 10 with a cap 14 disposed at a downstream end 13 of the flow control actuator 10. The flow control actuator extends from an upstream wall 12 to the downstream end 13, and from a first sidewall 16A to a second sidewall 16B. In the interior of the flow control actuator 10 is a region A in which combustion may occur. In the embodiment of FIG. 4, each of the first and second sidewalls 16A, 16B are discrete planar walls, forming a non-circular cavity in the interior of the flow control actuator. Disposed in the upstream wall 12 is a fuel injector 20 and an air inlet 28.

In the embodiment of FIG. 4, a positively charged electrode and/or electrical conductor 88 is disposed in the first sidewall 16A. The flow control actuator 10 illustrated in FIG. 4 also includes a negatively charged electrode and/or electrical conductor 90 disposed in the second sidewall 16B. In operation, hot plasma is created within the interior of the flow control actuator 10 due to the oppositely charged electrodes disposed in the first and second sidewalls 16A, 16B on either side of the non-circular cavity. The thermal energy in the hot plasma is then transferred in the form of heat to the interior of the flow control actuator 10.

Figure 5:
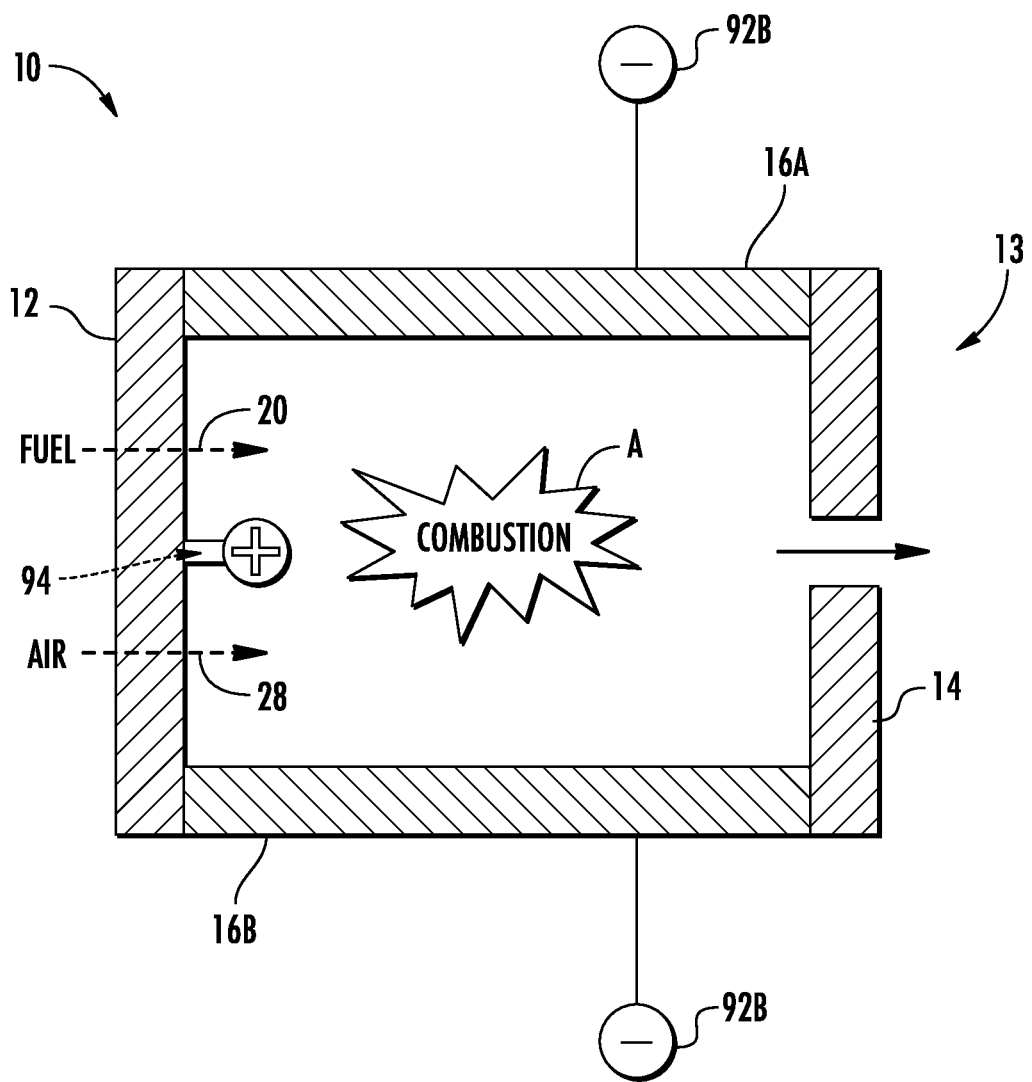
FIG. 5 is a side schematic representation of a flow control actuator.

FIG. 5 illustrates a flow control actuator 10 with a cap 14 disposed at a downstream end 13 of the flow control actuator 10. The flow control actuator extends from an upstream wall 12 to the downstream end 13, and from a first sidewall 16A to a second sidewall 16B. In the interior of the flow control actuator 10 is a region A in which combustion may occur. In the embodiment of FIG. 5, each of the first and second sidewalls 16A, 16B are discrete planar walls, forming a non-circular cavity in the interior of the flow control actuator. Disposed in the upstream wall 12 is a fuel injector 20 and an air inlet 28.

In the embodiment of FIG. 5, a positively charged electrode and/or electrical conductor 94 is disposed in the upstream wall 12. The positively charged electrode 94 may protrude into the interior of the flow control actuator 10. The flow control actuator 10 illustrated in FIG. 5 also includes a first negatively charged electrode and/or electrical conductor 92A disposed in the first sidewall 16A and a second negatively charged electrode and/or electrical conductor 92B disposed in the second sidewall 16B. In operation, hot plasma is created within the interior of the flow control actuator 10 due to the oppositely charged electrodes 92A, 92B, 94 disposed in the first and second sidewalls 16A, 16B and in the upstream wall. The thermal energy from the hot plasma increases the temperature in the interior of the flow control actuator 10.

Figure 6:
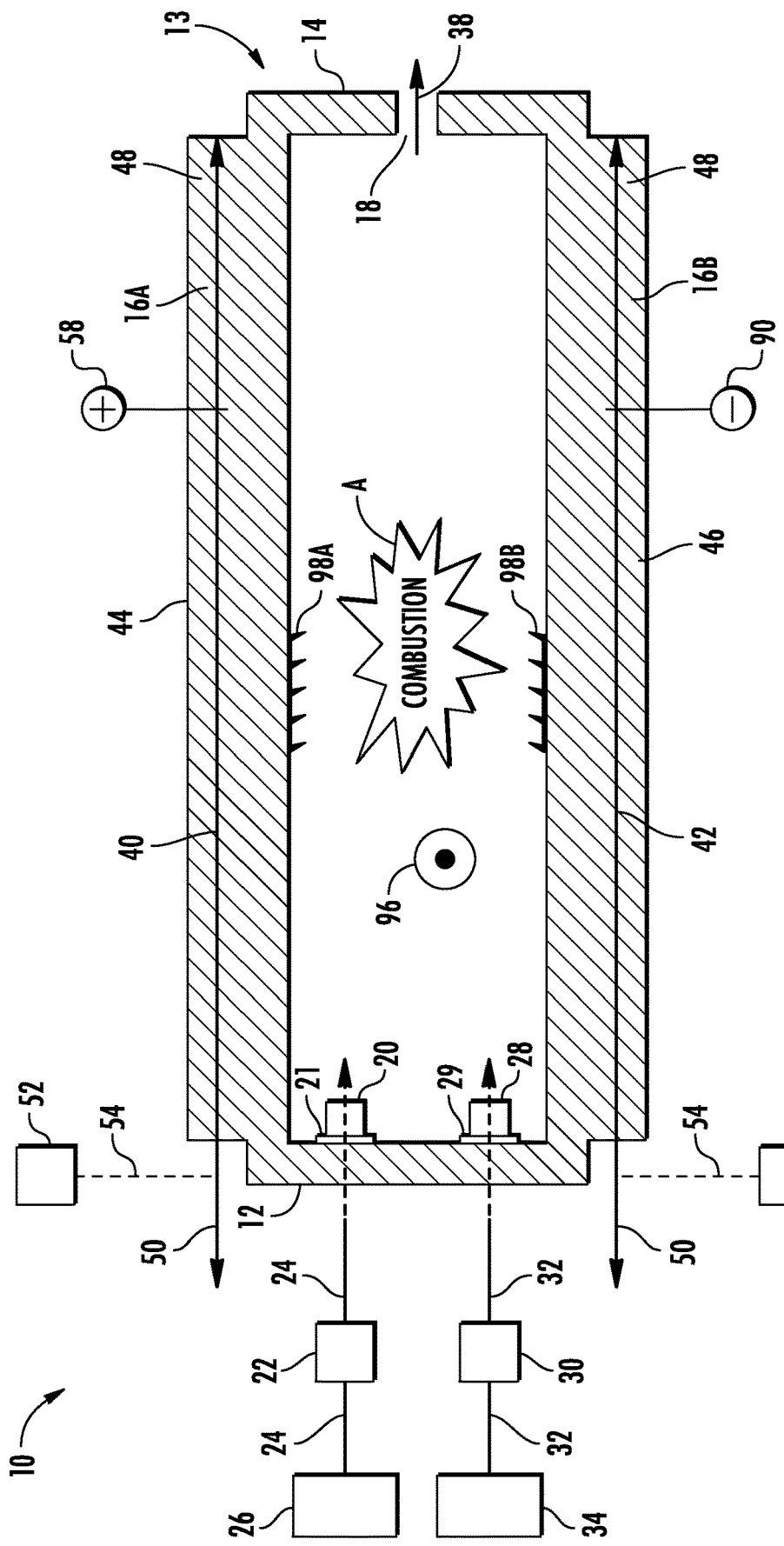
FIG. 6 is a side schematic representation of a flow control actuator.

FIG. 6 illustrates a flow control actuator 10 with first and second fluid conduits 40, 42, similar to the embodiment of FIG. 2. The embodiment of FIG. 6 may also include a positively charged electrode and/or electrical conductor 88 disposed in the first sidewall 16A, and a negatively charged electrode and/or electrical conductor 90 disposed in the second sidewall 16B. The embodiment of FIG. 6 may also include a second air inlet 96 aligned in a circumferential direction (i.e., into the page) in embodiments that include an annular combustor or aligned in a perpendicular direction (i.e., again into the page) in embodiments that include other configurations, for introducing additional air into the interior of the flow control actuator 10. The embodiment of FIG. 6 may also include a first plurality of burners 98A disposed at the interior boundary of the first sidewall 16A as well as a second plurality of burners 98B disposed at the interior boundary of the second sidewall 16B. The first and second pluralities of burners 98A, 98B may be used to increase the temperature of the interior of the flow control actuator 10. Various arrangements of the present embodiments may include all of the features shown in FIG. 6 as well as various subsets of the features illustrated in FIG. 6. In each of the embodiments of FIGS. 3-6, the positions of the respective electrodes (56, 58, 88, 90, 92A, 92B, 94) may be switched. For example, either the positively or the negatively charged electrode(s) electrodes (56, 58, 88, 90, 92A, 92B, 94) may be disposed in the upstream or downstream positions, and/or on the first side wall 16A, the second side wall 16B, and/or the upstream wall 12. Each of the present embodiments may include both fuel and/or air inlets disposed within the upstream wall 12 and/or in the first and second side walls 16A, 16B, and or in any circumferential and/or perpendicular side walls (i.e., sidewalls that are parallel with the plane of the page, for example in embodiments of the flow control actuator 10 that have square and/or rectangular cross sections). In operation, fuel and/or air may be discharged from all location as well as from each location individually, depending on the operating conditions.

Figure 7:
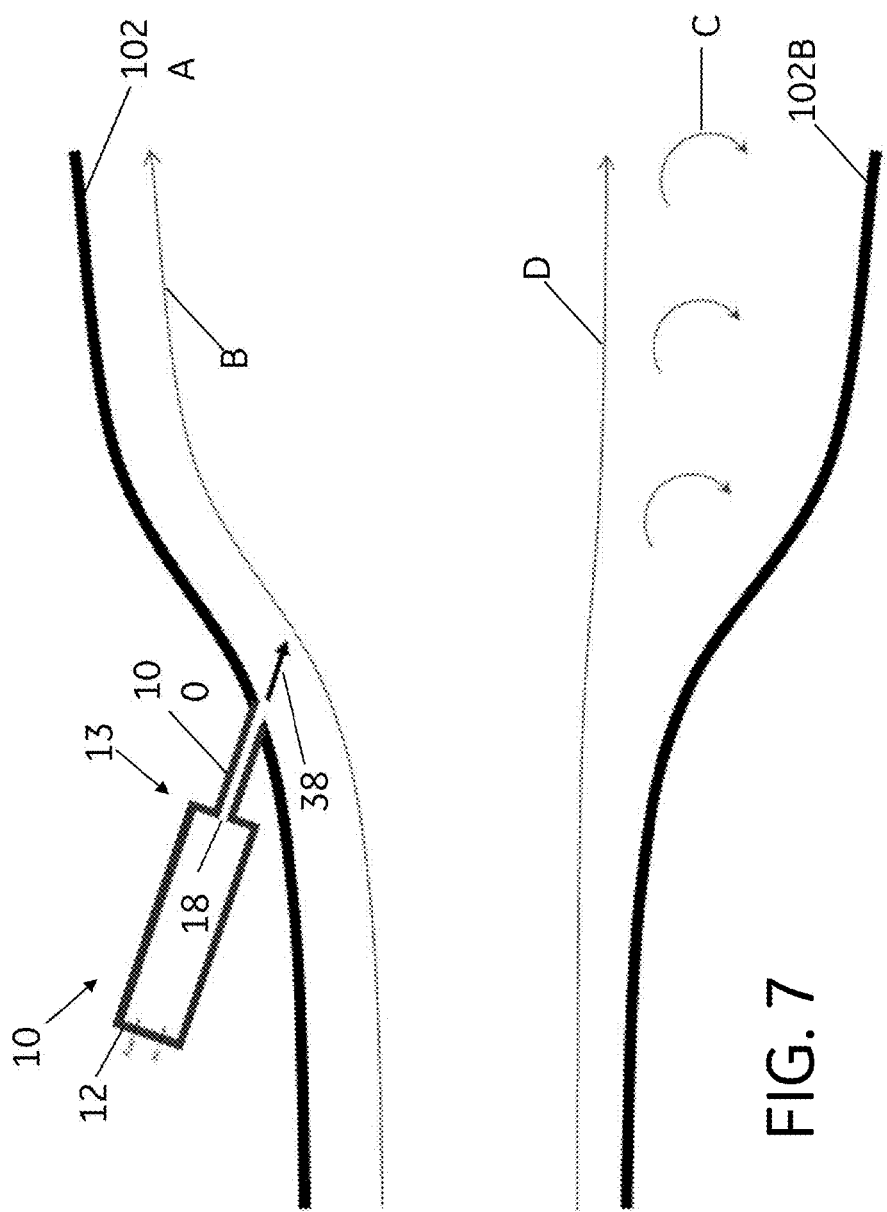
FIG. 7 is a side schematic representation of a flow control system including a target surface.

FIG. 7 illustrates a flow control actuator 10 in a flow separation mitigation application. The flow control actuator 10 is fluidly coupled to a first surface 102A. The first surface 102A is a target surface for the flow or high-speed jet 38 exiting the flow control actuator 10. The first surface 102A and/or target surface may be an airfoil, a control surface for an aircraft, an exhaust panel or exhaust nozzle on an aircraft engine exhaust, a turbine nozzle, and/or other surfaces for which flow control is desired. The target surface 102A may also be a surface of hot gas path component of a gas turbine engine such as a turbine airfoil, a turbine nozzle, a shroud, a strut, an inner flow path band, and outer flow path band as well as other components. The flow control actuator 10 is fluidly connected to the target surface 102A via a discharge tube 100 that connects to the downstream end 13 of the flow control actuator 10 at the orifice 18. FIG. 7 also illustrates a second surface 102B which is not fluidly coupled to a flow control actuator. In operation, the flow control actuator 10 induces a Cuandă effect on the target surface 102A, increasing the velocity of flow in the boundary layer via the high-speed jet 38 which drags a first laminar flow B along with it, thereby promoting attachment of the first laminar flow B to the target surface 102A. In comparison, a plurality of turbulent rotational flows or eddies C form along the second surface 102B, which is not fluidly coupled to a flow control actuator. The presence of the plurality of turbulent rotational flows or eddies C that form along the second surface 102B increases the drag across the second surface 102B and push a second laminar flow D further away from the second surface 102B, as compared to the relative distance of the first laminar flow B to the first surface 102A. Therefore, the flow control actuator 10 induces more efficient flow across the target surface 102A as compared to the flow across the second surface 102B.

Figure 8:
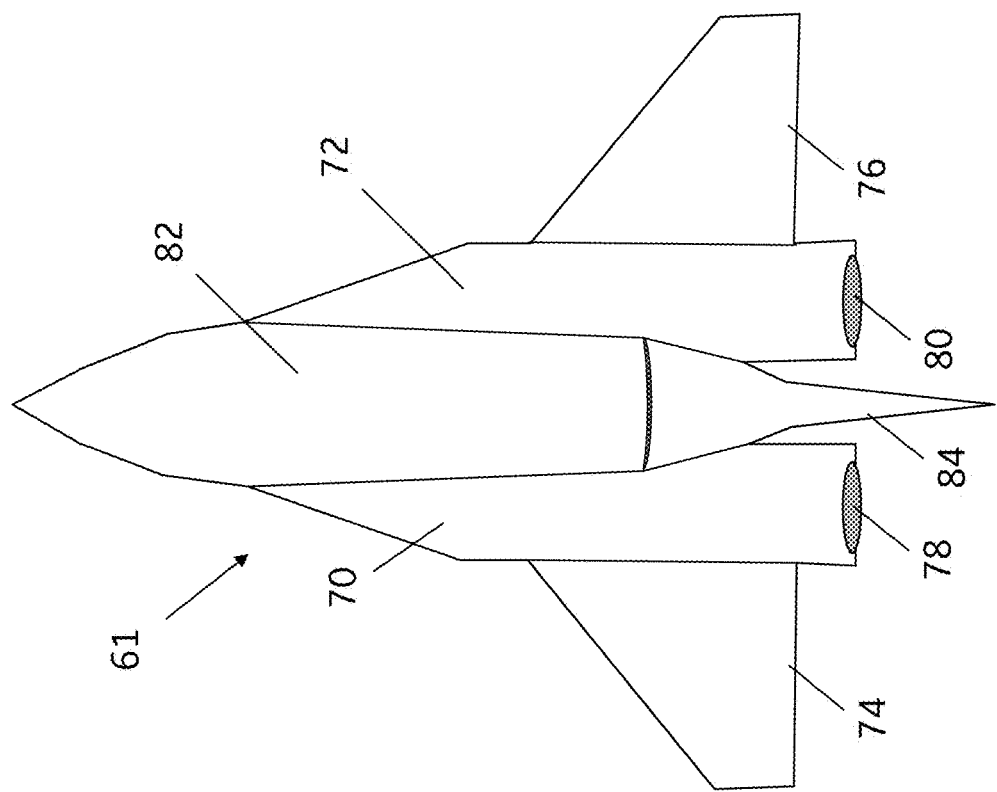
FIG. 8 is a top view of a supersonic aircraft illustrating flow control actuator installation locations.

FIG. 8 illustrates a top view of an exemplary supersonic aircraft 61. The flow control actuator 10 (not shown) of the present embodiments may be used in supersonic aircraft 61 applications. For example, the flow control actuator 10 may be disposed on surfaces of the supersonic aircraft 61 including, but not limited to, a left control surface 70, a right control surface 72, a left wing 74, a right wing 76, a left engine 78, a right engine 80, a central aircraft body portion 82, and a tail portion 84. In addition, the flow control actuator 10 may be disposed on corresponding surfaces to those mentioned above (as well as other surfaces) on the underside of the supersonic aircraft 61. The flow control actuator 10 may also be disposed on an aircraft engine airfoil (not shown), a turbine nozzle (not shown), an exhaust nozzle (not shown), an augmenter, as well as elsewhere.

Figure 9:
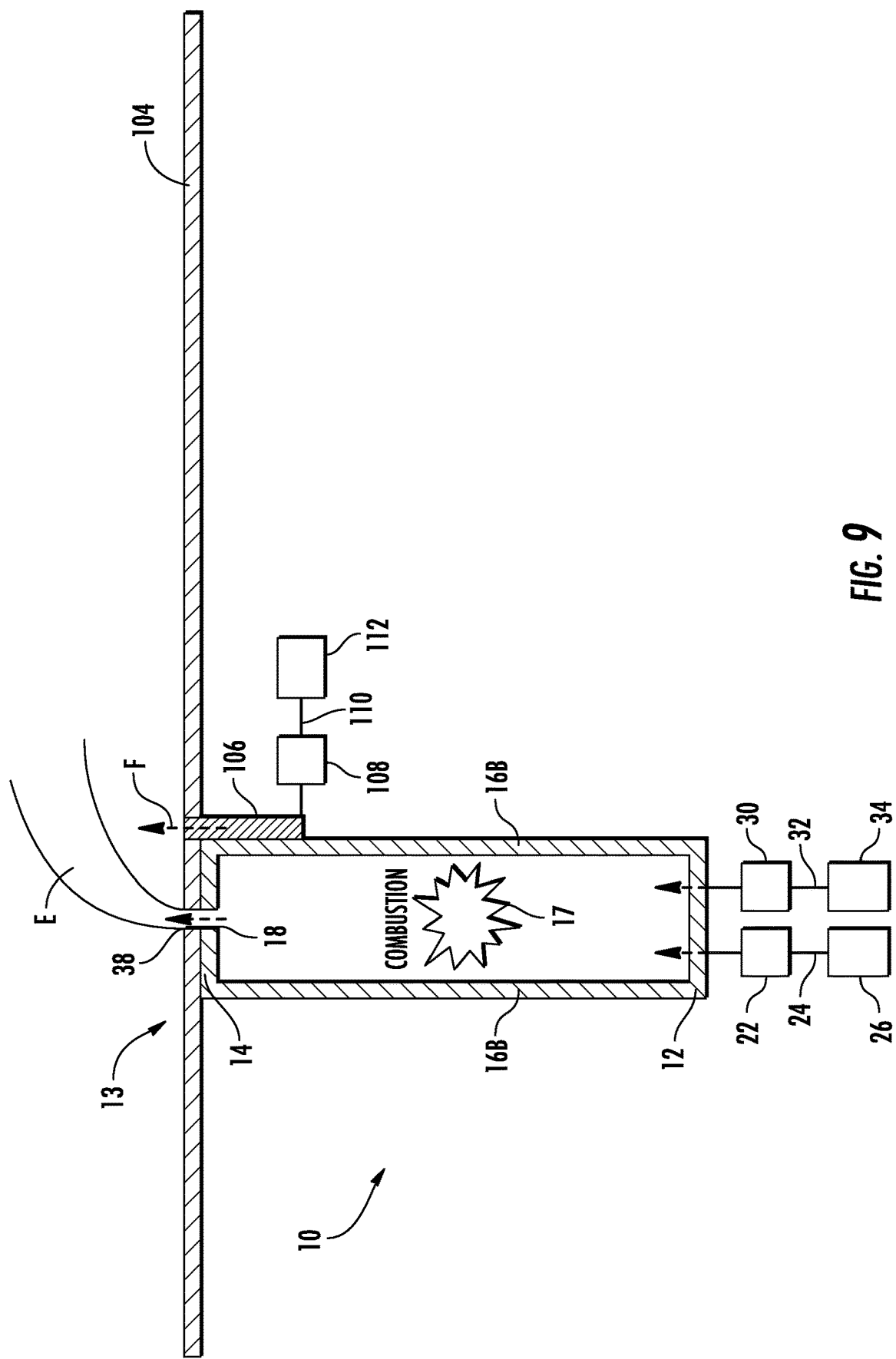
FIG. 9 illustrates a side view of a flow control actuator including external fuel injection.

FIG. 9 illustrates a side view of a flow control actuator 10 including external fuel injection. The embodiment of FIG. 9 includes an upstream wall 12, a downstream cap 14 at a downstream end 13, an orifice 18, a fuel control valve 22, a fuel supply line 24, a fuel supply 26, an airflow control mechanism 30, an air supply line 32, and an air supply 34. In the embodiment of FIG. 9, the flow control actuator 10 includes an external fuel injector 106 disposed adjacent at least one of the side walls 16A, 16B of the flow control actuator 10. The flow control actuator 10 may be disposed adjacent a target surface 104 in order to disperse combustion gases E and fuel F on, along, or in the vicinity of the target surface 104 via both the orifice 18 and the external fuel injector 106. An external fuel control valve 108, an external fuel supply line 110, and an external fuel supply 112 may all be fluidly coupled upstream of the external fuel injector 106. The embodiment of FIG. 9 may be cylindrical, annular, and/or may have substantially planar sidewalls 16A, 16B as well as planar circumferential endwalls (not shown). In one embodiment, the first and/or second sidewalls 16A, 16B of the flow control actuator 10 form a cylindrical tube around a central combustion cavity or chamber 17.

In operation, the flow control actuator 10 illustrated in FIG. 9 may be used to inject fluids into an external fluid flow (i.e., across target surface 104, for example). Fuel F is injected through the external fuel injector 106 in close proximity to the combustion gases E exiting the combustion chamber 17 via orifice 18. The fuel F is ignited creating a secondary combustion event (i.e., in addition to the combustion occurring in the interior of the flow control actuator 10). The secondary combustion event may serve to augment the performance of flow control actuator 10. The fuel F may be injected downstream of the combustion gases E exiting the orifice 18, thereby creating a wake (low speed region) which assists ignition of the fuel F. The presence of the fuel F injected downstream of the combustion gases E exiting the orifice 18 may allow the combustion gases E to shed vortices which have formed in the wake of the high speed jet 38 (not shown).

Figure 10:
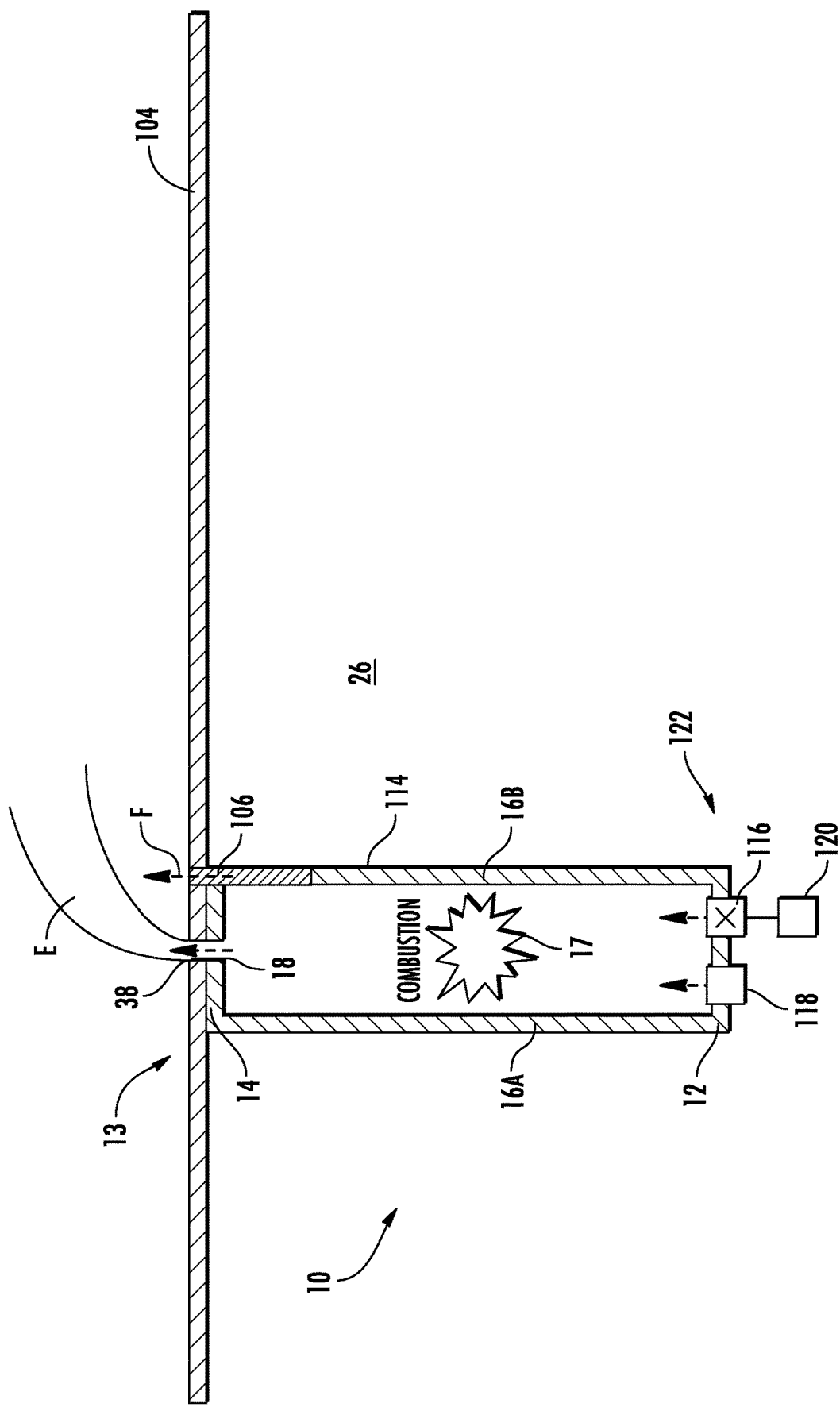
FIG. 10 illustrates a side view of a flow control actuator including external fuel injection.

FIG. 10 illustrates a side view of a flow control actuator 10 including external fuel injection. The embodiment of FIG. 10 includes an upstream wall 12, a downstream cap 14 at a downstream end 13, an orifice 18, a fuel supply system 120 including a control valve 22 (not shown), a fuel supply line 24 (not shown), a fuel supply 26 (not shown), an air supply system 118 including an airflow control mechanism 30 (not shown), an air supply line 32 (not shown), and an air supply 34 (not shown). In the embodiment of FIG. 10, the flow control actuator 10 includes an external fuel injector 106 disposed adjacent at least one of the side walls 16A, 16B of the flow control actuator 10. The flow control actuator 10 may include an external fuel line 114 fluidly connecting the external fuel injector 106 to a fuel system 122. The external fuel line 114 may extend from an upstream end 12 of the flow control actuator 10 to a downstream end 13, adjacent at least one of the first and second side walls 16A, 16B, for delivering fuel to the external fuel injector 106. The fuel system 122 may include the fuel supply system 120 as well as a 3-way fuel control valve 116 which controls a first flow of fuel to the interior of the flow control actuator, and a second flow of fuel to the external fuel injector 106 via the external fuel line 114. The flow control actuator 10 may be disposed adjacent a target surface 104 in order to disperse combustion gases E and fuel F on, along, or in the vicinity of the target surface 104 via the orifice 18 as well as the external fuel injector 106. The embodiment of FIG. 10 may be cylindrical, annular and/or may have substantially planar sidewalls 16A, 16B as well as planar circumferential endwalls (not shown).

Still referring to FIG. 10, the external fuel line 114 may be integrated into at least one of the side walls 16A, 16B. For example, in some embodiments, the fuel may have picked up heat from a heat source elsewhere in the system and then as the fuel is routed through the external fuel line 114 which is integrated into at least one of the side walls 16A, 16B, the fuel may dissipate heat into the one or more side wall 16A, 16B. In other conditions, the fuel may act to cool at least one of the first and second side wall 16A, 16B. For example, even in conditions where at least one side wall 16A, 16B is heated, the exterior and/or outer periphery of the side wall 16A, 16B may need to be cooled in order to manage the various thermal loads in the flow control actuator 10 relative to other components in the system. In cases where fuel is acting to cool at least a portion of the one or more side wall 16A, 16B, it may be preferable to route the external fuel line 114 along an outer periphery of the flow control actuator 10. In yet other embodiments, fuel may be used to both heat and cool at least a portion of the one or more side wall 16A, 16B, via the external fuel line 114. For example, as fuel flows through the external fuel line 114, it may act as either a heat source or heat sink depending on whether the temperature of the fuel is greater than the temperature of the one or more side wall 16A, 16B. In embodiments where fuel is used to both heat and cool at least a portion of the one or more side wall 16A, 16B, the fuel may be used to maintain at least a portion of the one or more side wall 16A, 16B within a desired temperature range.

Figure 11:
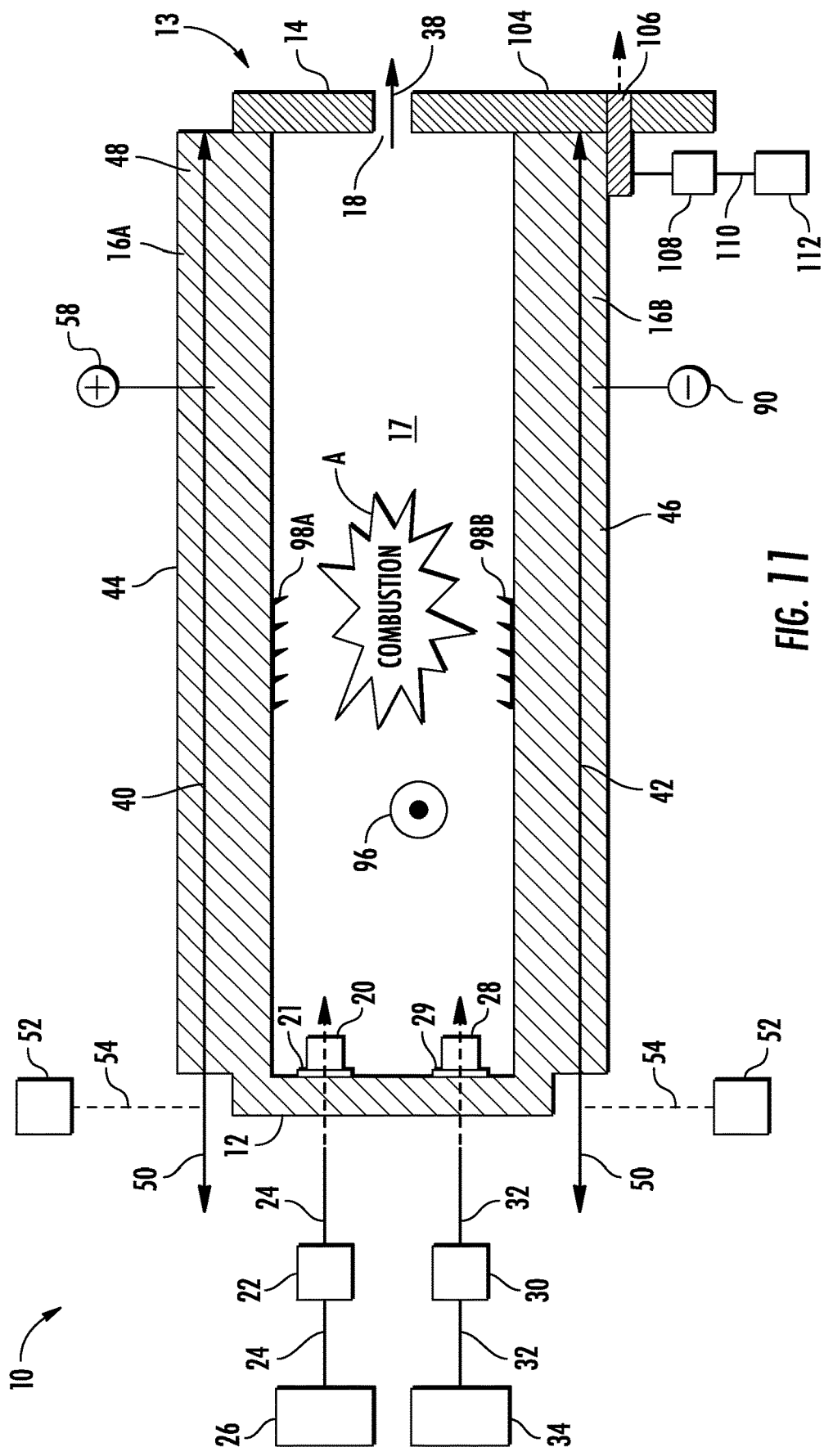
FIG. 11 illustrates a side view of a flow control actuator including external fuel injection.

FIG. 11 illustrates a side view of a flow control actuator 10 including external fuel injection. The embodiment of FIG. 11 is similar to the embodiment of FIG. 6. In the embodiment of FIG. 11, the flow control actuator 10 includes an external fuel injector 106, an external fuel control valve 108, an external fuel supply line 110, and an external fuel supply 112. The embodiment of FIG. 11 may also include an external fuel line 114 (not shown) and 3-way fuel control valve 116 similar to those of FIG. 10 fluidly coupled upstream of the fuel injector 106, instead of the external fuel control valve 108, the external fuel supply line 110 and the external fuel supply 11.

Figure 12:
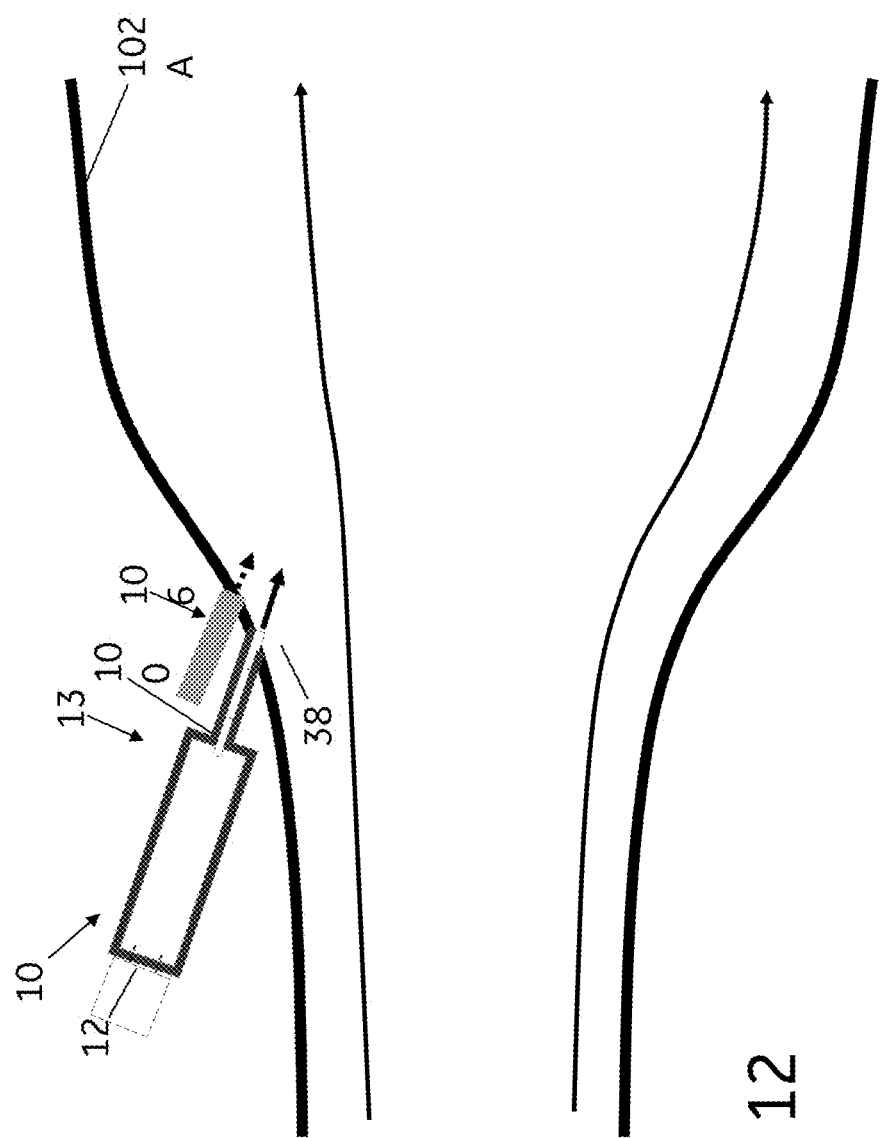
FIG. 12 illustrates a side view of a flow control actuator including external fuel injection, according to aspects of the present embodiments.

FIG. 12 illustrates a side view of a flow control actuator 10 including external fuel injection. The flow control actuator 10 of the embodiment of FIG. 12 includes an upstream wall 12, a downstream end 13, a discharge tube 100 exhausting a high speed jet 38 at a first surface 102A, and an external fuel injector 106. The embodiment of FIG. 12 may be used in an aircraft application in which the flow control actuator 10 including the external fuel injector 106 modifies an engine exhaust nozzle flow field for the purpose of thrust vectoring, as well as for other purposes.

Each of the embodiments disclosed herein include fuel being combusted in the presence of an oxidizer. Fuel mixes with an oxidizer during or prior to the combustion process. The embodiments disclosed herein include air as one possible oxidizer. However, other oxidizers such as straight oxygen (i.e., pure oxygen) are also possible. In various conditions, oxygen may be a preferred oxidizer over air. In other conditions, air may be the preferred oxidizer. As used herein, the terms "oxygen" and "pure oxygen," may include gas that is at least about 80% oxygen by mass. In some embodiments, the oxidizer may be at least about 90% oxygen by mass. In other embodiments, the oxidizer may be about 93% to about 99.3% oxygen by mass. In other embodiments, the oxidizer may be greater than about 99.3% oxygen by mass. (By comparison, air is about 21% oxygen, about 78% nitrogen and about 1% other gases). Other oxidizers other than oxygen and air are also possible. In embodiments other that use an oxidizer other than air, those embodiments will include the corresponding system components including, for example, an oxidizer inlet 28, an oxidizer supply line 32, an oxidizer supply 34, an oxidizer flow control mechanism 30, an oxidizer flow modulator 29, and a second oxidizer inlet 96, referring to the features of FIGS. 1, 2, 6, 9, and 11.

Each of the embodiments disclosed herein include a source of ignition which may be in the form of a spark igniter and/or via autoignition (i.e., via heated sidewalls, for example) as well as via volumetric ignition. Some embodiments may include multiple sources of ignition. For example, in some embodiments, at least one spark igniter may be used during some operating conditions and then ignition may transition to autoignition and/or volumetric ignition at other operating conditions.

The present embodiments include a combustion-powered flow control actuator 10 which is similar to a traditional pulse detonation actuation (PDA), as fuel and air are ignited in a cavity or chamber 17, which ultimately creates a high-speed jet 38 that is emitted from one or a group of holes or orifices 18 in the flow control actuator 10. High-speed jets 38 can be used for active flow control for a variety of applications. The present embodiments involve heating the side walls 16A, 16B to initiate detonation much more rapidly, which may result in a decrease in the size of the flow control actuator 10 as well as reduced weight and an increase in the operating frequency. The embodiments presented herein show a single hole exiting the downstream end 13 of the flow control actuator 10. However, the present claimed embodiments may also include multiple holes in the cap 14 at the downstream end 13, as well as through the side walls 16A, 16B, through which gases may exit. The embodiments presented herein operate on a kilohertz range (1000 Hz to 1000 kHz), which is faster than the 100 Hz operating frequency of previous pulse detonation actuators (PDA). As such, the embodiments presented herein may provide a more continuous and less pulsed high-speed jet 38 discharging from the flow control actuator 10 compared to previous pulse detonation actuators (PDA).

Embodiments herein provide means for transferring heat from the first and second sidewalls 16A, 16B into the interior of the flow control actuator 10, which help heat the fuel above the autoignition temperature, which in turn aids in the transition from deflagration to detonation. Detonation may produce a more efficient combustion than deflagration. Therefore, the present claimed embodiments, may allow for an increase in the volume of the flow control actuator 10 in which detonation is occurring while simultaneously allow for a decrease in the volume of the flow control actuator 10 in which deflagration is occurring. This may result in an overall increase in the combustion efficiency as well as enhanced combustion stability. The present embodiments include various heat sources that provide approximately 1000° C. of heat addition in 10 milliseconds, raising the interior of the flow control actuator 10 above the autoignition temperature.

The flow control actuators 10 of the present embodiments offer both high operating frequency and significant control authority which provides benefits in numerous practical applications, such as engine exhaust thrust vectoring for vehicle control or boundary layer separation control for aircraft lift enhancement and drag reduction. The flow control actuators 10 of the present embodiments may also be used as igniters for engines in supersonic and/or hypersonic applications, for example in scramjet engines. The combustion-based actuator of the present embodiments takes advantage of the energy dense fuel, and therefore, requires significantly less external air.

Exemplary applications of the flow control actuators of the present embodiments may include high-speed aircraft, separation control on airfoils, flame holders, flame stability, augmenters, propulsion, flight stability, flight control as well as other uses. The magnitude of the heat input into the flow control actuator via heated walls and other conduits depends on the specific application and factors such as heat transfer characteristics, combustion dynamics, aerodynamics as well as other factors.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flow control actuator comprising:
    a first sidewall;
    a second sidewall opposite the first sidewall;
    an upstream wall coupled to the first sidewall and the second sidewall;
    a downstream cap coupled to the first sidewall and the second sidewall, the first sidewall, the second sidewall, the upstream wall, and the downstream cap defining an interior of the flow control actuator;
    a heater disposed at a boundary between the interior of the flow control actuator and the first sidewall;
    at least one energy source disposed in the first sidewall, the at least one energy source including a positively charged electrode and a negatively charged electrode between which the heater extends, the heater configured to carry electrical charge from the positively charged electrode to the negatively charged electrode and create thermal energy that is transferred to the interior of the flow control actuator to increase a temperature of the interior of the flow control actuator;
    at least one fuel injector disposed in at least one of the upstream wall, the first sidewall, or the second sidewall, the at least one fuel injector dispersing fuel into the interior of the flow control actuator; and
    at least one air inlet disposed in at least one of the upstream wall, the first sidewall, or the second sidewall, the at least one air inlet introducing air into the interior of the flow control actuator, and
    wherein the heater extends continuously between the upstream wall and the downstream cap, and
    wherein the heater and the energy source are configured to provide approximately 1000 degrees Celsius of heat addition in 10 milliseconds to raise a temperature of the interior of the flow control actuator above an autoignition temperature of a fuel and air mixture in the interior of the flow control actuator.

2. The flow control actuator of claim 1, wherein the first sidewall and the second sidewall form an integral continuous cylindrical tube.

3. The flow control actuator of claim 1, wherein the negatively charged electrode is disposed downstream of the positively charged electrode.

4. The flow control actuator of claim 1, further comprising at least one igniter disposed in at least one of the first sidewall or the second sidewall.

5. The flow control actuator of claim 1, further comprising at least one orifice disposed in the downstream cap, wherein combustion gases from the interior of the flow control actuator exit the flow control actuator via the at least one orifice.

6. The flow control actuator of claim 1, further comprising at least one igniter disposed in at least one of the first sidewall or the second sidewall between about 0% and about 50% of a distance from the upstream wall to the downstream cap.

7. A flow control actuator comprising:
    a plurality of sidewalls extending from an upstream wall at a first end of a tube and a downstream cap at an opposite second end of the tube, the upstream wall, the plurality of sidewalls, and the downstream cap defining an interior of the tube, the plurality of sidewalls include a first sidewall and a second sidewall;
    at least one energy source disposed in the first sidewall, the at least one energy source including a positively charged electrode disposed in the first sidewall and a negatively charged electrode disposed in the second sidewall,
    a fuel injector disposed in at least one of the upstream wall or the plurality of sidewalls, the fuel injector dispensing fuel into the interior; and
    an air inlet disposed in at least one of the upstream wall or the plurality of sidewalls, the air inlet introducing air into the interior,
    a heater disposed at a boundary between the interior of the flow control actuator and the first sidewall;
    wherein the heater and the energy source are configured are configured to provide approximately 1000° C. of heat addition in 10 milliseconds to raise a temperature of the interior of the flow control actuator above the autoignition temperature of a fuel and air mixture in the interior of the flow control actuator.

8. The actuator of claim 7, further comprising:
    an igniter disposed in the one or more sidewalls.

9. A flow control actuator comprising:
    a plurality of sidewalls extending from an upstream wall at a first end of the plurality of sidewalls and a downstream cap at an opposite second end of the plurality of sidewalls, the upstream wall, the one or more plurality of sidewalls, and the downstream cap defining an interior;
    a heater disposed at a boundary between the interior of the flow control actuator and the first sidewall;
    at least one energy source disposed in the first sidewall, the at least one energy source including a positively charged electrode and at least one negatively charged electrode, a fuel injector disposed in the upstream wall, the fuel injector dispensing fuel into the interior; and an air inlet disposed in the upstream wall, the air inlet introducing air into the interior, and wherein one of i) the positively charge electrode and ii) the at least one negatively charged electrode is disposed in the upstream wall, and the other of i) the positively charged electrode and ii) the at least one negatively charged electrode is disposed in a first sidewall of the plurality of sidewalls, wherein the heater and the energy source are configured to provide approximately 1000° C. of heat addition in 10 milliseconds to raise a temperature of the interior of the tube above the autoignition temperature of a fuel and air mixture in the interior of the flow control actuator.

10. The actuator of claim 9, further comprising:

an igniter disposed in the one or more sidewalls.

\* \* \* \* \*